United States Patent
Shimahara et al.

(10) Patent No.: US 11,280,364 B2
(45) Date of Patent: Mar. 22, 2022

(54) TORQUE LIMITATION DEVICE HAVING THREE WEBS

(71) Applicant: Hilti Aktiengesellschaft, Schaan (LI)

(72) Inventors: Hideki Shimahara, Grabs (CH); Erich Infanger, Schiers (CH)

(73) Assignee: Hilti Aktiengesellschaft, Schaan (LI)

( * ) Notice: Subject to any disclaimer, the term of this patent is extended or adjusted under 35 U.S.C. 154(b) by 232 days.

(21) Appl. No.: 16/475,509

(22) PCT Filed: Dec. 5, 2017

(86) PCT No.: PCT/EP2017/081467
§ 371 (c)(1),
(2) Date: Jul. 2, 2019

(87) PCT Pub. No.: WO2018/127336
PCT Pub. Date: Jul. 12, 2018

(65) Prior Publication Data
US 2019/0331154 A1    Oct. 31, 2019

(30) Foreign Application Priority Data
Jan. 5, 2017   (EP) .................................... 17150333

(51) Int. Cl.
*F16B 31/02* (2006.01)
*F16B 13/06* (2006.01)
*F16B 37/14* (2006.01)

(52) U.S. Cl.
CPC .......... *F16B 31/021* (2013.01); *F16B 13/065* (2013.01); *F16B 37/14* (2013.01); *F16B 31/02* (2013.01)

(58) Field of Classification Search
CPC ........ F16B 13/065; F16B 31/00; F16B 31/02; F16B 31/021; F16B 31/025; F16B 31/028; F16B 31/04; F16B 37/14; Y10S 411/917
(Continued)

(56) References Cited

U.S. PATENT DOCUMENTS 1,380,395 A * 6/1921 Korach ................. F16B 39/286
                                                               411/3
2,394,812 A * 2/1946 Seitz ..................... F16B 39/286
                                                               411/5
(Continued)

FOREIGN PATENT DOCUMENTS

AU      2009200994       11/2009
CN      202914489 U       5/2013
(Continued)

OTHER PUBLICATIONS

International Search Report of PCT/EP2017/081467, dated Jan. 31, 2018.

*Primary Examiner* — Roberta S Delisle
(74) *Attorney, Agent, or Firm* — Davidson, Davidson & Kappel, LLC

(57) ABSTRACT

A device for torque limiting is provided, including a holding element for a nut or a screw head, the holding element including a top part having an entrainment profile in a rear area of the holding element for the rotatably fixed coupling of the top part with a setting tool, and the holding element including a receiving part having a receptacle in a front area of the holding element for rotatably fixedly accommodating the nut or the screw head. According to the invention, the holding element includes three torque-transmitting webs, which connect the receiving part and the top part and which form a predetermined breaking point. The invention also (Continued)

relates to a fastening arrangement made up of a device of this type and an expansion anchor.

7 Claims, 2 Drawing Sheets

(58) Field of Classification Search
USPC .................................. 411/1, 2, 3, 5–6, 432
See application file for complete search history.

(56) References Cited

U.S. PATENT DOCUMENTS

| | | | |
|---|---|---|---|
| 3,370,341 A * | 2/1968 | Allsop | B65D 21/0219 |
| | | | 29/413 |
| 3,444,775 A * | 5/1969 | Hills | F16B 31/021 |
| | | | 411/5 |
| 3,482,864 A * | 12/1969 | Jerrym | F16B 31/021 |
| | | | 411/5 |
| 3,728,933 A | 4/1973 | Grube et al. | |
| 3,742,583 A * | 7/1973 | Devlin | F16B 31/021 |
| | | | 29/413 |
| 3,978,761 A * | 9/1976 | Sosinski | F16B 31/021 |
| | | | 411/5 |
| 4,046,052 A | 9/1977 | Nordstrom | |
| 4,215,600 A | 8/1980 | Kesselmann et al. | |
| 4,729,703 A * | 3/1988 | Sato | F16B 31/021 |
| | | | 411/237 |
| 5,865,581 A * | 2/1999 | Sadri | F16B 31/021 |
| | | | 411/5 |
| 6,176,659 B1 * | 1/2001 | Hardt | F16B 31/021 |
| | | | 411/393 |
| 6,406,240 B1 * | 6/2002 | Potter | F16B 37/0864 |
| | | | 411/267 |
| 9,194,417 B2 | 11/2015 | Marchand et al. | |
| 9,316,248 B2 | 4/2016 | Appl et al. | |
| 9,970,467 B2 | 5/2018 | Dijkhuis et al. | |
| 10,584,731 B2 | 3/2020 | Gstach et al. | |
| 2002/0076295 A1 | 6/2002 | Rodney | |
| 2003/0198528 A1 | 10/2003 | Onishi et al. | |
| 2004/0226419 A1 | 11/2004 | Morgan | |
| 2012/0328388 A1 * | 12/2012 | Hardt | H01R 4/307 |
| | | | 411/5 |
| 2013/0303293 A1 | 11/2013 | Eckstein et al. | |
| 2015/0226248 A1 * | 8/2015 | Robertson, Jr. | F16B 31/021 |
| | | | 405/288 |
| 2016/0053792 A1 | 2/2016 | Rosenkranz et al. | |
| 2016/0305464 A1 * | 10/2016 | Balderrama | F16B 31/021 |
| 2017/0343026 A1 | 11/2017 | Schaeffer | |
| 2019/0338796 A1 | 11/2019 | Shimahara | |
| 2019/0338800 A1 | 11/2019 | Shimahara | |

FOREIGN PATENT DOCUMENTS

| | | |
|---|---|---|
| CN | 103180623 B | 6/2013 |
| CN | 203230709 U | 9/2013 |
| CN | 105190058 A | 12/2015 |
| CN | 105556138 A | 5/2016 |
| CN | 105705804 A | 6/2016 |
| CN | 105829735 A | 8/2016 |
| DE | 102010042260 | 4/2012 |
| DE | 102010043167 | 5/2012 |
| DE | 102011106696 A1 | 1/2013 |
| EP | 1353080 B1 | 10/2003 |
| EP | 2952755 B1 | 8/2020 |
| FR | 2598855 A1 | 1/1987 |
| GB | 1330320 | 11/1987 |
| JP | S4520582 Y1 | 8/1970 |
| JP | H0685918 U | 12/1994 |
| JP | 2000257623 A | 9/2000 |
| JP | 2001140832 A | 5/2001 |
| RU | 2012105535 A | 8/2013 |
| WO | WO2011007052 A1 | 1/2011 |
| WO | WO2017050725 | 3/2017 |
| WO | WO2018127337 A1 | 7/2018 |
| WO | WO2018127338 A1 | 7/2018 |

* cited by examiner

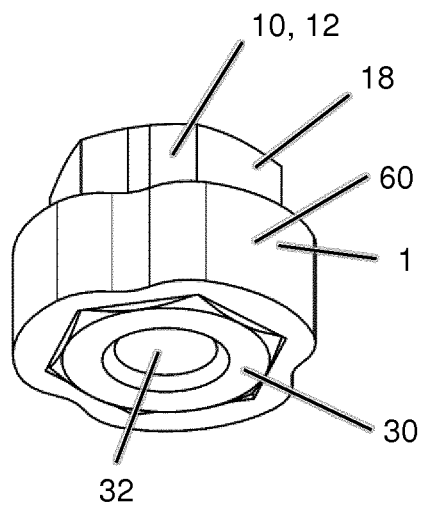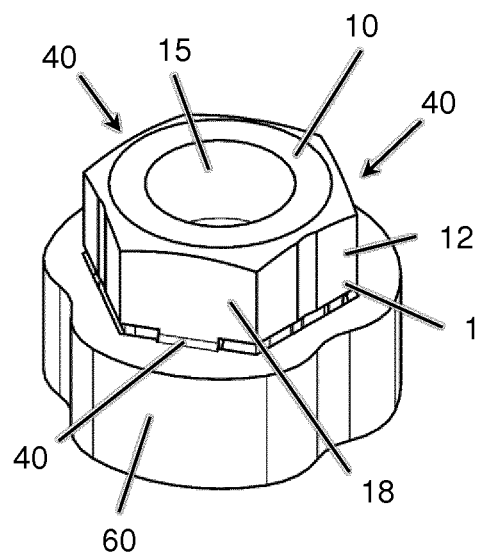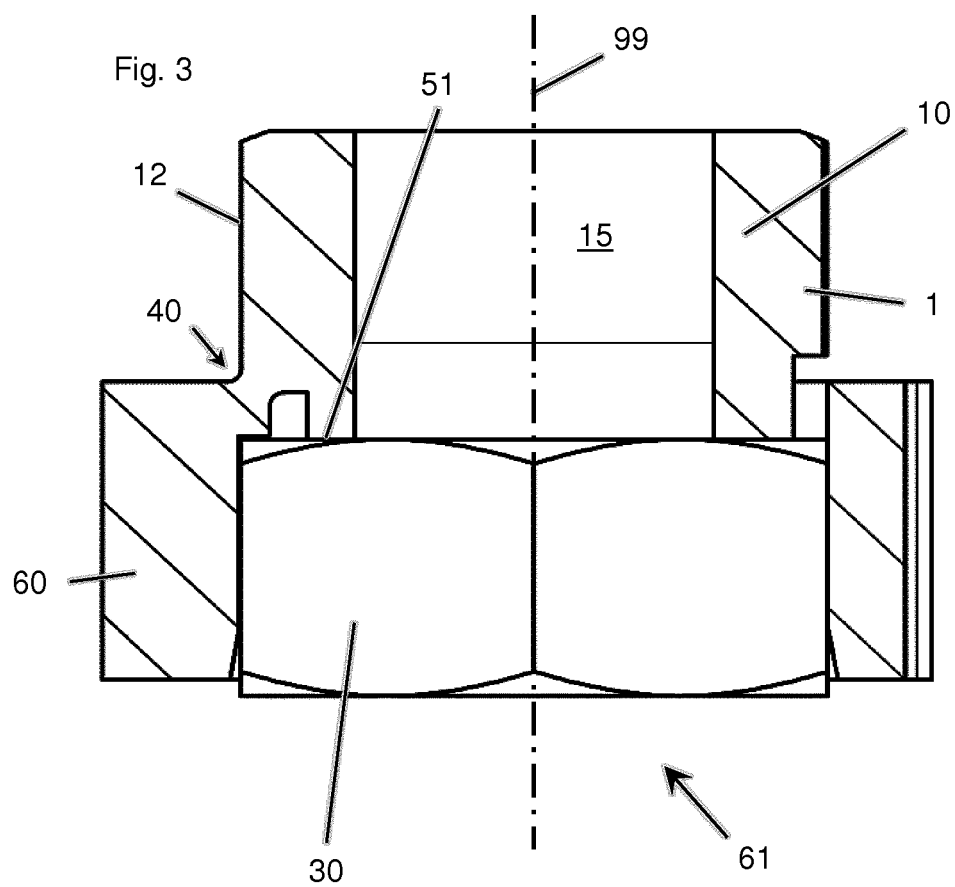

US 11,280,364 B2

TORQUE LIMITATION DEVICE HAVING THREE WEBS

The present invention relates to a device for torque. A device of this type is equipped with a holding element for a nut or a screw head, the holding element including a top part having an entrainment profile in a rear area of the holding element for the rotatably fixed coupling of the top part with a setting tool, and the holding element including a receiving part having a receptacle in a front area of the holding element for rotatably fixedly accommodating the nut or the screw head. The present invention also relates to a fastening arrangement, including a device of this type and an expansion anchor.

BACKGROUND

A generic device for torque limiting is known from DE 102010043167 A1. The device is designed in a crown-like manner, including a top part and a receiving part having a nut, a predetermined breaking point being provided between the top part and the receiving part, which breaks upon reaching a limiting torque. The predetermined breaking part is formed by six webs, which are situated equidistantly between the top part and the receiving part.

Similar crown-like devices for torque limiting are described in the international patent application having the PCT file number PCT/EP2016/072232 (now published as WO 2017050725 A1), in FR 2598855 A1 and in U.S. Pat. No. 4,215,600 A. According to U.S. Pat. No. 4,215,600 A, clamping projections formed as a single piece with the receiving part may be provided for the nut in the interior of the receiving part, which act laterally against the nut.

A screw having a multi-part head is derived from DE 102011106696 A1 which includes an outer sleeve, which is rotatable around an inner part of the head.

EP1353080 B1 shows a torque limiting element for expansion anchors.

SUMMARY OF THE INVENTION

It is an object of the present invention to provide a device for torque limiting, which ensures a particularly good breaking precision and reliability with little complexity, in particular manufacturing complexity, as well as to provide a fastening arrangement which combines a device of this type with an expansion anchor.

The present invention provides device for torque limiting and a fastening arrangement.

A device according to the present invention for torque limiting is characterized in that the holding element includes three, in particular exactly three, torque-transmitting webs, which connect the receiving part and the top part and which form a predetermined breaking point, in particular a torque predetermined breaking point.

In contrast to devices according to the prior art, in which the predetermined breaking point is formed by six torque-transmitting webs or a ring-like element, according to the present invention the predetermined breaking point is formed by exactly three torque-transmitting webs, which connect the receiving part and the top part. Within the scope of the present invention, it has surprisingly been found that, due to a design of this type, a particular low distribution may be obtained in the breaking torques, and thus a particularly good breaking precision and simultaneously a particularly robust device. In the design according to the present invention including three torque transmitting webs, the webs have relatively large cross sections, compared to a design having six or more torque-transmitting webs. Large web cross sections, in turn, may frequently be particularly effectively controlled with regard to manufacturing, in particular if the holding element is small and/or, in particular, if the holding element is a cast part, so that the breaking precision is also high within greater manufacturing tolerances. At the same time, with three torque-transmitting webs, a sufficiently large number of torque-transmitting webs is present to implement a good force transmission without a tendency toward tilting, which effectively counteracts an undesirable stressing and thus a potential weakening of the torque-transmitting webs, which potentially has negative effects on the breaking precision. The present invention thus makes use of the finding that, in an arrangement having three torque-transmitting webs, the influence of manufacturing tolerances is comparatively low, while the force transmission is particularly good. Based on this finding, the present invention provides a device for torque limiting, in which a particularly good breaking precision and reliability exist with little manufacturing complexity.

The nut may be, for example, a DIN nut. It advantageously has a through-opening, preferably with a female thread, it being possible to screw the female thread, in particular, onto a threaded rod. The threaded rod may preferably be the bolt of an expansion anchor. The nut may then be, in particular, a screw nut. Instead of having a nut, the device according to the present invention may also be used with a screw head, which is, in particular, rotatably fixedly connected to a screw shaft. The nut or the screw head may be viewed, for example, as part of the device for torque limiting or as a separate part.

The entrainment profile is used for rotatably fixedly coupling the output side of the setting tool to the top part and, in particular, for applying a torque from the setting tool to the top part, in particular a torque directed in the axial direction. The entrainment profile may be, for example, an outer polygonal profile, in particular an outer hexagonal profile, which is situated on the circumferential side of the top part. The setting tool may be, for example, a wrench or a handheld power tool.

The receptacle is at least partially open toward the front, in particular so that the nut is accessible on its front side, and a threaded rod may be screwed into the nut from the front or so that a screw shaft may emerge from the holding element. The design of the receptacle at least partially open toward the front may also facilitate an introduction of the nut or the screw head from the front during manufacturing. The top part may preferably have a passage for the threaded rod, the passage opening into the receptacle for the nut, and the passage being open toward the back. Accordingly, the threaded rod screwed into the nut may emerge again from the nut and the holding element at the back, i.e. the threaded rod may pass through the holding element.

The receptacle may be, in particular, a recess formed in the holding element, into which the nut or the screw head is placed. The receptacle is preferably delimited by the receiving part on the circumferential side and/or delimited by the top part on the rear side. The receptacle part preferably forms a sleeve, which surrounds the receptacle. The nut or the screw head is rotatably fixedly situated in the receptacle, in particular situated in the receptacle, rotatably fixedly coupled with the receiving part, i.e. a connection exists between the receiving part and the nut situated in the receptacle or the screw head situated in the receptacle, preferably a form-fitting connection, which facilitates a transmission of a torque, in particular an axially directed torque, between the receiving part, on the one hand, and the nut or the screw head, on the other hand. The receptacle may preferably include another entrainment profile, for example an inner polygonal profile, in particular an inner hexagonal profile, for the rotatably fixed connection between the receiving part, on the one hand, and the nut or screw head, on the other hand, which corresponds to an outer profile of the nut or the screw head.

In particular, the device according to the present invention is designed in such a way that the torque transmitting webs break preferentially at a limiting torque, interrupting the connection between the top part and the receiving part. Preferential breaking may be understood to mean, in particular, that the torque-transmitting webs break at a lower torque than the top part and the receiving part. The torque-transmitting webs thus form a torque predetermined breaking point, in particular for a torque directed in the axial direction. The torque-transmitting webs thus form the weakest link in the torque transmission, which is the first to break. Due to the manufacturing fluctuations alone, additional web-like structures, for example burrs, may be present between the top part and the receiving part, which then do not significantly contribute to the torque transmission and which are thus not torque-transmitting webs.

To the extent that the axial direction, radial direction and/or circumferential direction are mentioned herein, these are to relate, in particular, to the same axis, which may be, in particular, the longitudinal axis and/or axis of symmetry of the device. The direction indications of front, back, front-side, rear, etc. are preferably to be used uniformly here.

It is particularly preferred that the three torque-transmitting webs are situated equidistantly, in particular around the longitudinal axis of the device. Accordingly, adjacent torque-transmitting webs are each situated at the same angular distance from each other. The holding element, at least its torque-transmitting webs, is preferably rotationally symmetrical around the longitudinal axis. Due to this design, a particularly good force transmission is possible, and undesirable tilting moments, which could potentially impair the breaking precision, are avoided.

In particular, the nut or the screw head may have an outer hexagonal profile, which may be advantageous already with regard to availability and manufacturing complexity. The nut may thus be, in particular, a hexagon nut.

Accordingly, the receptacle advantageously has six key surfaces and, in particular, one inner hexagonal profile. These key surfaces may correspond to the six key surfaces of the nut or the screw head. The individual key surfaces of the receptacle may also include projections or recesses, for example for clamping the nut or the screw head.

It is particularly preferred that the three torque-transmitting webs are situated offset with respect to three of the six key surfaces of the receptacle, in particular offset in the circumferential direction. Accordingly, the torque-transmitting webs are situated in the axial continuation of exactly three of the six key surfaces, and the three torque-transmitting webs, in particular, do not span the edges of the inner hexagonal profile of the receptacle. A particularly good decoupling of the torque-transmitting webs from the receiving mechanism for the nut or the screw head is made possible hereby, and undesirable notching effects may be counteracted in a particularly structurally simple manner, both of which, in turn, may further improve the breaking precision.

It may preferably be provided that the holding element includes at least one clamping projection situated on a clamping key surface of the receptacle and protruding into the receptacle for fixing, in particular firmly clamping, the nut or the screw head in the receptacle. This makes it possible to easily and reliably counteract an undesirable slipping of the nut or the screw head out of the receptacle. In particular, the clamping projection may press the nut or the screw head against the opposite key surface, and secure the nut or the screw head axially in a force- and/or form-fitting manner. The key surface of the receptacle on which the clamping projection is situated is referred to here as the clamping key surface. It is particularly advantageous that the three torque-transmitting webs are situated offset, in particular offset in the circumferential direction, with respect to the at least one clamping key surface having the clamping projection. Stresses generated by the clamping projection may be particularly easily and simultaneously effectively decoupled from the torque-transmitting webs hereby, which, in turn, may be advantageous for the breaking precision. The clamping projection is preferably formed by a crown on the receiving part. The clamping projection may have an insertion bevel for the nut or the screw head to simplify assembly.

For a particularly reliable securing and continued good breaking precision, the holding element preferably includes at least three clamping projections for fixing the nut or the screw head in the receptacle, which are each situated on different clamping key surfaces of the receptacle, the three torque-transmitting webs being situated offset, in particular offset in the circumferential direction, with respect to these three clamping key surfaces provided with the clamping projections.

Another preferred embodiment of the present invention is that the entrainment profile of the top part has top part key surfaces, which run in parallel to the key surfaces of the receptacle. All top part key surfaces of the top part preferably each run in parallel to one key flat of the receptacle. This may further relieve the torque-transmitting webs of undesirable influences, which may be advantageous for the breaking precision. In particular, the entrainment profile may be a hexagonal profile, which has the same angular position around the longitudinal axis of the device as the hexagonal profile of the receptacle. Accordingly, the top part preferably has six top part key surfaces.

The device for torque limiting is preferably made from a casting material, in particular a zinc die casting material, which facilitates a particularly easy, economical and precise manufacturing. A zinc die casting material is advantageously selected, which undergoes little plastic deformation prior to breaking, which again may be advantageous for the breaking precision.

The present invention also relates to a fastening arrangement made up of an expansion anchor and a device according to the present invention for torque limiting, a nut or a screw head of an expansion anchor being situated in the receptacle. An expansion anchor may be understood according to usual practice to be an anchor which includes an expansion element, for example an expansion sleeve, which is offset radially to the outside for anchoring when pulled in the threaded rod.

Features which are explained in connection with the device according to the present invention for torque limiting may also be used for the fastening arrangement according to the present invention, and conversely features which are explained in connection with the fastening arrangement according to the present invention may also be used for the device according to the present invention for torque limiting.

BRIEF DESCRIPTION OF THE DRAWINGS

The present invention is explained in greater detail below on the basis of preferred exemplary embodiments, which are represented schematically in the attached figures, it being possible, in principle, to implement individual features of the exemplary embodiments illustrated below individually or in an arbitrary combination within the scope of the present invention.

FIG. 1 schematically shows a perspective representation of a specific embodiment of a device according to the present invention for torque limiting, for example including a nut, with a view of the front side of the device;

FIG. 2 schematically shows a perspective representation of the device from FIG. 1, with a view of the back side of the device;

FIG. 3 shows a longitudinal sectional view of the device for torque limiting from FIGS. 1 and 2, i.e. a sectional view in a longitudinal sectional plane of the device;

DETAILED DESCRIPTION

Figure 4:
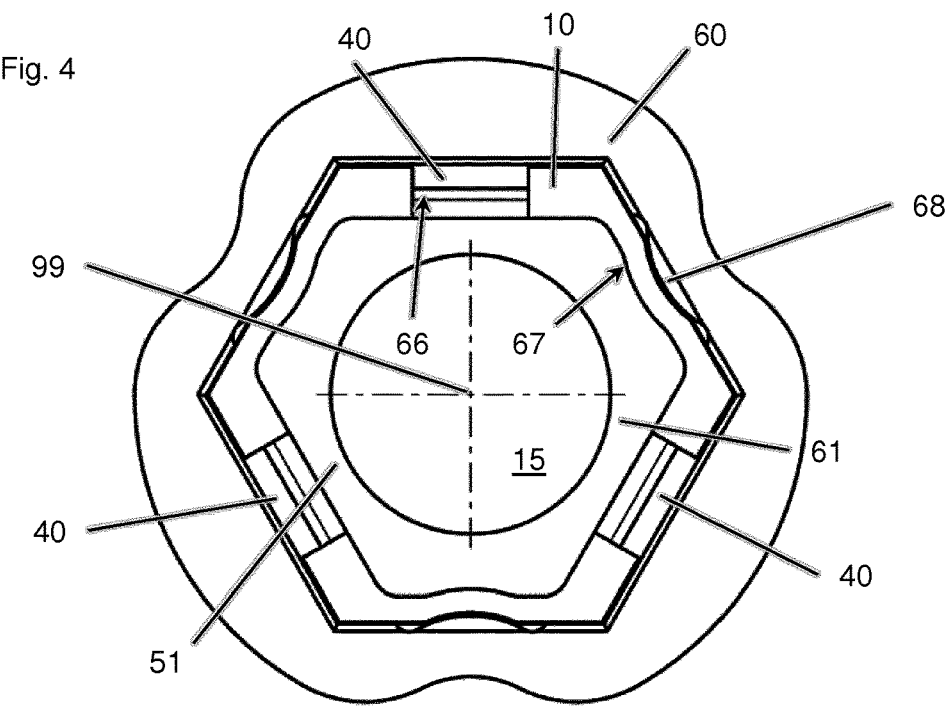
FIG. 4 shows a view from below of the holding element of the device for torque limiting from FIGS. 1 through 3, without a nut.

The figures show a first exemplary embodiment of a device according to the present invention for torque limiting. As these figures show, the device includes an example of a nut 30 having a female thread 32, on the one hand, and a crown-shaped holding element 1, on the other hand, in which nut 30 is held. Nut 30 is shown only as an example and, in particular, a screw head may also be provided instead of the nut.

Holding element 1 includes a top part 10 in its rear area, a receiving part 60 in its front area, situated toward the front of top part 10, as well as three torque-transmitting webs 40. Torque-transmitting webs 40 connect top part 10 and receiving part 60 and form a torque predefined breaking point between top part 10 and nut 30. Torque-transmitting webs 40 extend from top part 10 radially outwardly toward receiving part 60 which has a larger outer diameter than top part 10. Top part 10 and receiving part 60 are spaced apart from each other between adjacent torque-transmitting webs 40. In particular, a slit-like opening, which leads from the outside into receptacle 61, is formed in each case between two adjacent torque-transmitting webs 40 between top part 10 and receiving part 60. Torque-transmitting webs 40 are situated equidistantly around longitudinal axis 99 of the device, the device preferably being rotationally symmetrical around longitudinal axis 99.

A receptacle 61, in which nut 30 is accommodated, is formed in receiving part 60. As is apparent, in particular in FIG. 4, receptacle 61 has six key surfaces 66 for the form-fitting torque transmission from receiving part 60 to nut 30, which form an inner hexagonal profile and which correspond to an outer hexagonal profile of nut 30. Three of these six key surfaces 66 are designed as clamping key surfaces 67. As such, they each have a clamping projection 68, which protrudes on receiving part 60 radially inwardly into receptacle 61. The total of three clamping projections 68 secure nut 30 against falling out of receptacle 61 toward the front.

As is also shown, in particular, in FIG. 4, each of three torque-transmitting webs 40 is situated in the axial continuation of exactly one of three key surfaces 66, i.e. remaining three key surfaces 66 are offset with respect to the torque-transmitting webs in the circumferential direction. Each torque-transmitting web 40 is thus assigned to exactly one key surface 66, and the elongation of the edges of the inner hexagonal profile of receptacle 61 is thus always web-free. Therefore, since torque-transmitting webs 40 are offset with respect to the edges of inner hexagonal profile in the circumferential direction, a particularly good decoupling may be possible between these elements.

As is further shown in FIG. 4, key surfaces 66 to which torque-transmitting webs 40 are assigned are advantageously not clamping key surfaces 67, i.e. three torque transmitting webs 40 are offset with respect to three clamping key surfaces 67 and/or three clamping projections 68 around longitudinal axis 99 in the circumferential direction. A particularly good decoupling of the stresses of torque-transmitting webs 40, which occur at clamping projections 68 during the clamping operation, may be obtained hereby.

Top part 10 has an entrainment profile 12, designed for example as an outer hexagonal profile having six top part key surfaces 18, with the aid of which a torque is transmittable from a setting tool, which is not illustrated, to top part 10 in a form-fitting manner. Receiving part 60 and top part 10 are arranged coaxially and define shared longitudinal axis 99 of the device. Top part 10 has a passage 15, which is flush with receptacle 61 of receiving part 60, so that a threaded rod 81 screwed into nut 30 may emerge from receiving part 60 on the back side of receiving part 60 along longitudinal axis 99. Longitudinal axis 99 runs through receptacle 61 and passage 15, which opens into receptacle 61. Six top part key surfaces 18 and key surfaces 66 of receptacle 61 each run in parallel to each other, i.e. the outer hexagonal profile of top part 10 and the inner hexagonal profile of receptacle 61 are situated at the same rotation angle.

As is apparent in FIG. 3 in particular, top part 10 includes an axial stop 51, which is situated on the rear end face of receptacle 61 and which forms a rear stop for nut 30. Axial stop 51 limits an axial movement of nut 30 accommodated in receptacle 61 relative to top part 10 and toward the back. The example of axial stop 51 in this case is formed by an annular, preferably closed, projection, which protrudes from top part 10 into receptacle 61.

Figure 5:
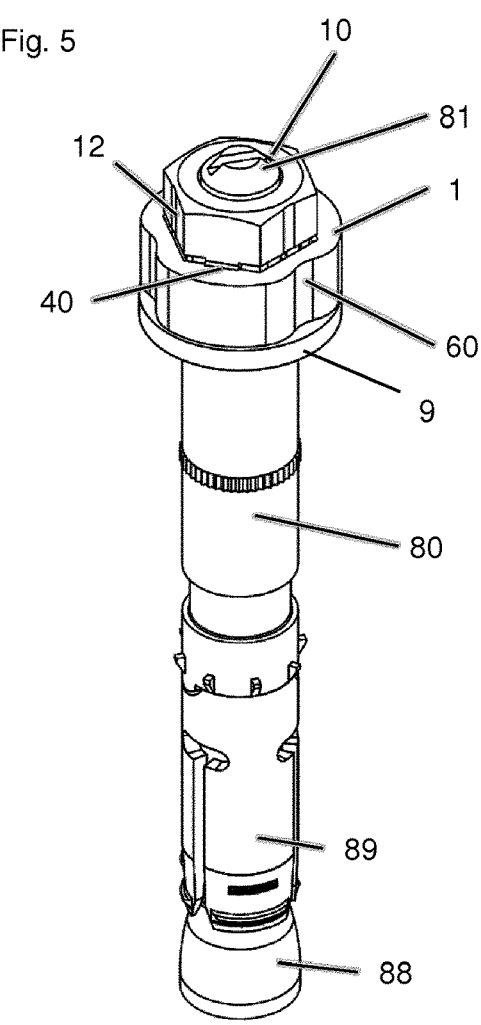
FIG. 5 schematically shows a fastening arrangement made up of a device for torque limiting according to FIGS. 1 through 4 and an expansion anchor in a perspective view, with a view of the back side of the device for torque limiting.
Figure 6:
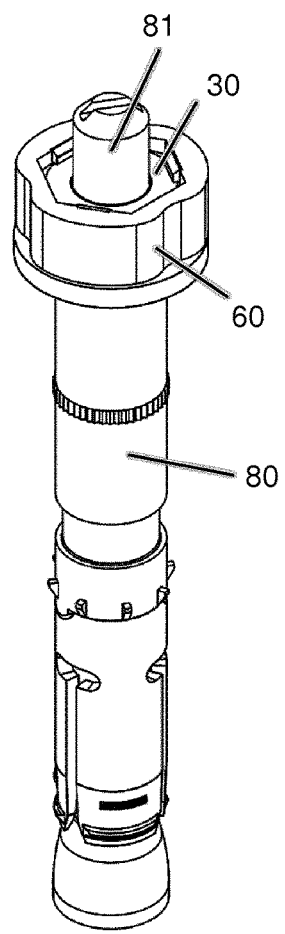
FIG. 6 shows the fastening arrangement according to FIG. 5 after the top part shears off upon reaching the limiting torque.

FIGS. 5 and 6 show a fastening arrangement made up of the device for torque limiting and an expansion anchor 80. In mechanical anchors of this type, an installation with a defined pretension by tightening with a defined limiting torque may be relevant, for example to avoid chipping in the substrate when mounted near the edge. Expansion anchor 80 is designed by way of example as a so-called sleeve anchor. It includes a threaded rod 81 as well as an expansion element 89, which in this case is designed as an expansion sleeve surrounding threaded rod 81. An expansion body having a preferably conical bevel 88, which tapers toward the back, is situated on threaded rod 81, in particular in a front area. A wedge gear is formed between bevel 88 of threaded rod 81 and expansion element 89, which is able to convert an axial movement of the unit formed from threaded rod 81 and the expansion body having bevel 88 relative to expansion element 89 into a radial movement of expansion element 89 and thereby anchor the anchor on the wall of a borehole for diverting tensile loads in threaded rod 81.

In the fastening arrangement in FIGS. 5 and 6, nut 30 of the device for torque limiting is screwed onto threaded rod 81 of expansion anchor 80, threaded rod 81 of expansion anchor 80 passing through the device for torque limiting, i.e. entering the device on the front side and emerging from the device on the back side, and bevel 88 of expansion anchor 80 and expansion element 89 of expansion anchor 80 being situated in front of the device for torque limiting.

During mounting, expansion anchor 80 of the fastening arrangement is inserted through a washer 9 into a borehole. A torque is thus applied to top part 10 via entrainment profile 12 with the aid of a setting tool. This torque is transmitted to receiving part 60 via torque-transmitting webs 40 and from receiving part 60 on to nut 30. This, in turn, induces a tensile force in threaded rod 81 of expansion anchor 80, which, in turn, radially stresses expansion element 89 and thereby anchors expansion anchor 80.

If the torque applied to top part 10 reaches a predetermined limiting torque, torque-transmitting webs 40 shear off, resulting in the fact that top part 10 separates from receiving part 60 and torque is no longer transmitted to receiving part 60 and nut 30. The device for torque limiting therefore acts as a torque-limiting shear nut. After torque-transmitting webs 40 shear off, top part 10 is separated from receiving part 60 and falls off receiving part 60. Remaining receiving part 60, including nut 30, is shown in FIG. 6.

What is claimed is:

1. A device for torque limiting, the device comprising:
   a holding element for a nut or a screw head, the holding element including a top part having an entrainment profile in a rear area of the holding element for the rotatably fixed coupling of the top part with a setting tool; and
   the holding element including a receiving part having a receptacle in a front area of the holding element for rotatably fixedly accommodating the nut or the screw head,
   the holding element including three torque-transmitting webs connecting the receiving part and the top part and forming a predetermined breaking point.

2. The device as recited in claim 1 wherein the three torque-transmitting webs are situated equidistantly.

3. The device as recited in claim 1 wherein the receptacle has six key surfaces, the three torque-transmitting webs being situated offset with respect to three of the six key surfaces of the receptacle.

4. The device as recited in claim 1 wherein the holding element includes at least one clamping projection situated on a clamping key surface of the receptacle and protruding into the receptacle for fixing the nut or the screw head in the receptacle, the three torque-transmitting webs being situated offset with respect to the at least one clamping key surface having the clamping projection.

5. The device as recited in claim 1 wherein the entrainment profile of the top part has top part key surfaces running in parallel to the key surfaces of the receptacle.

6. The device as recited in claim 1 wherein the device is made from a zinc die casting material.

7. A fastening arrangement comprising an expansion anchor and the device for torque limiting as recited in claim 1, the nut or the screw head being part of the expansion anchor and being situated in the receptacle.

* * * * *